United States Patent [19]

Paterson

[11] 4,247,130
[45] Jan. 27, 1981

[54] SHOPPING CART CONSTRUCTION

[76] Inventor: Stephen Paterson, 4 Dartmouth St., Forest Hills Gardens, N.Y. 11375

[21] Appl. No.: 17,385

[22] Filed: Mar. 5, 1979

[51] Int. Cl.³ .............................................. B62B 11/00
[52] U.S. Cl. ..................................... 280/654; 220/19; 280/47.26
[58] Field of Search ................... 280/47.24, 47.26, 651, 280/652, 654, 655, DIG. 3; 220/19

[56] References Cited

U.S. PATENT DOCUMENTS

| 2,564,939 | 8/1951 | Weast | 280/652 |
| 2,891,802 | 6/1959 | Moran | 280/654 |
| 3,514,123 | 5/1970 | Injeski | 280/652 |

FOREIGN PATENT DOCUMENTS 548173  9/1956  Italy ....................... 280/47.26

*Primary Examiner*—John J. Love
*Assistant Examiner*—Michael Mar
*Attorney, Agent, or Firm*—Charles E. Temko

[57] ABSTRACT

A folding two-wheeled shopping cart having a rigid rear panel, a pair of hinged side panels, a flexible fabric front panel, and a bottom panel hingedly interconnected at a rear edge thereof to the rear panel. The bottom panel is provided with a manually engageable operating member enabling it to be moved between erected and folded positions, the bottom panel also slidably engaging the side panels and maintaining them in erected condition, while simultaneously tensing the front panel, thereby providing a rectangular enclosure for the reception of articles. A flexible canopy is secured at a rear edge thereof to the rear panel, and is selectively engaged with the upper edges of the side panels to cover the above enclosure and protect the contents against the elements when the device is used outdoors. The device can also be used as an open faced hand cart by disconnecting and pivoting the front panel about one or both side panels. In this condition, the device may be used to transport, for example, pieces of luggage, some or all of which may be of overall dimension greater than the enclosure. In this condition, it may also be used as an emergency baby stroller, by providing a pillow and seat. In completely folded condition, the side and bottom panels are placed in substantially coplanar relation with the back panel, and supporting wheels are placed in planes parallel thereto.

4 Claims, 10 Drawing Figures

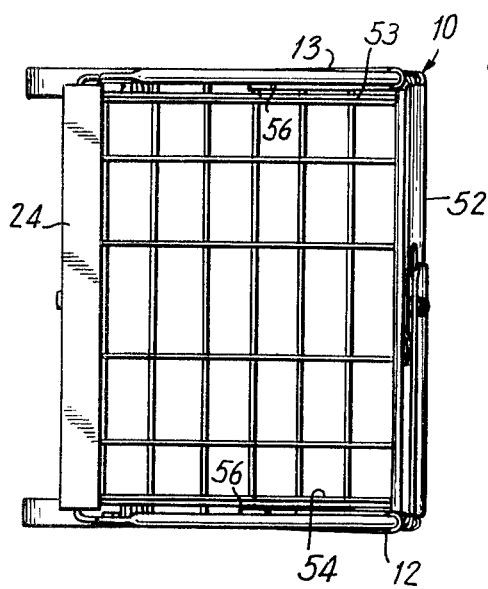
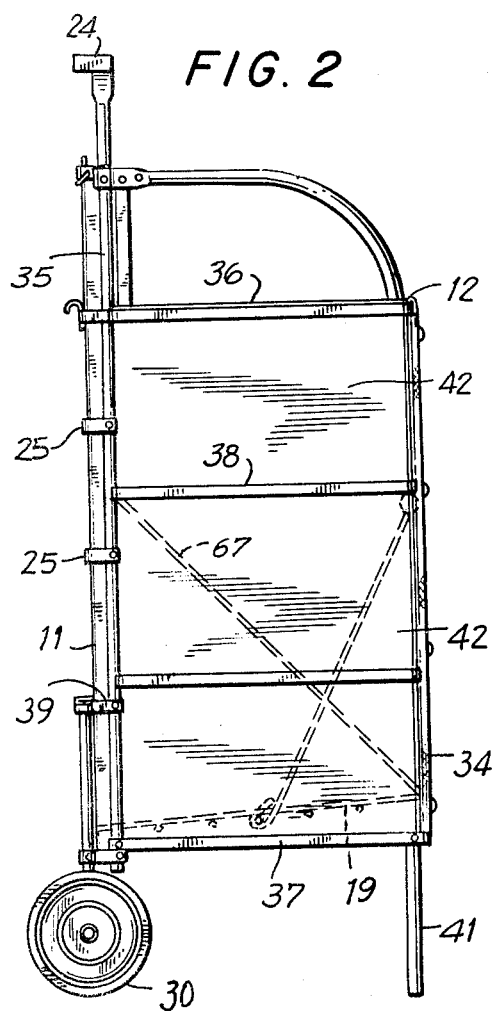
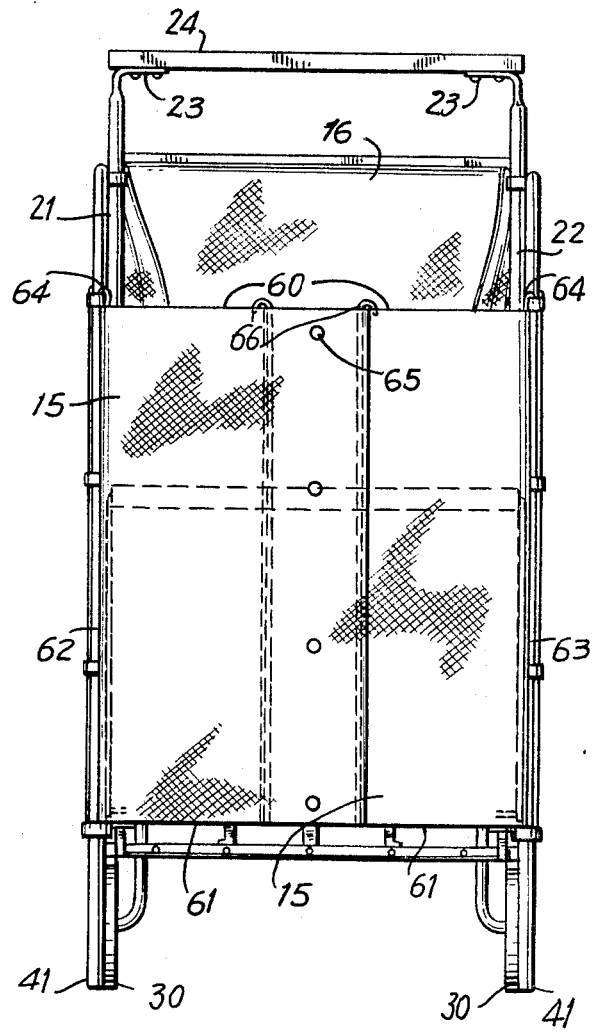

SHOPPING CART CONSTRUCTION

BACKGROUND OF THE INVENTION

This invention relates generally to the field of shopping carts, and more particularly to an improved form thereof of a type which is adapted to be placed in substantially planar configuration when collapsed. Devices of this general type are well known in the art, and the invention lies in specific constructional details which increase utility, facilitate manipulation, and substantially lower the cost of production.

It is among the principal objects of the present invention to provide an improved shopping cart of the class described, in which all manipulation thereof, including the erection, collapse and altering from one operative condition to another, may be performed by a user in standing position, without the necessity of bending or stooping.

Another object of the invention lies in the provision of an improved shopping cart construction having means for protecting the carried contents thereof from inclement weather by completely covering a load-carrying enclosure.

Another object of the invention lies in the provision of an improved shopping cart construction which may be readily converted from enclosed form capable of carrying a plurality of articles within an enclosure to an open form capable of carrying several large objects such as pieces of luggage, some or all of which may be of dimensions greater than that of the enclosure.

A further object of the invention lies in the provision of a shopping cart of the class described which, when in collapsed condition, is substantially planar in configuration, so as to require minimum storage space within a closet or trunk of an automobile.

A further object of the invention lies in the provision of an improved shopping cart possessed of the above-mentioned objects, in which the cost of fabrication may be of a reasonably low order, thereby pemitting consequent wide sale, distribution and use.

Yet another object of the invention lies in the provision of an improved shopping cart construction formed entirely of light-weight materials, thereby particularly adapting the cart for use by children and the elderly.

A feature of the disclosed embodiment lies in the provision of means whereby the folding of the device places the wheels in a plane parallel to a rear or main panel element.

These objects and features, as well as other incidental ends and advantages, will more fully appear in the progress of the following disclosure, and be pointed out in the appended claims.

SUMMARY OF THE INVENTION

Briefly stated, the invention contemplates the provision of an improved shopping cart comprising a main rear panel having a handle at an upper end thereof, and a pair of wheels at a lower end thereof. A pair of side panels are hingedly interconnected at the rear edges thereof to the rear panel. A bottom panel is hingedly connected along a horizontal axis to a lower part of the rear panel, and is provided with an elongated operating member which raises and lowers the bottom panel and serve as a means for tensing the forward edges of the side panels against a folded fabric front wall element. The wheels are mounted upon extensions of the side panels and are foldable therewith. A flexible canopy is secured at a rear edge thereof to a forward surface of the rear panel element, and selectively overlies the upper open end of an enclosure formed by the rear, side, bottom and front panel elements. The front panel is disconnectable to form an unenclosed cart structure suitable for carrying articles of dimensions larger than the previously formed enclosure. In this condition, the operating member is moved rearwardly to maintain the bottom panel in erected position.

BRIEF DESCRIPTION OF THE DRAWINGS

In the drawings, to which reference will be made in the specification, similar reference characters have been employed to designate corresponding parts throughout the several views.

FIG. 1 is a top plan view of an embodiment of the invention showing the same in fully erected condition.

FIG. 2 is a side elevational view thereof.

FIG. 3 is a front elevational view thereof.

DETAILED DESCRIPTION OF THE DISCLOSED EMBODIMENTS

Figure 4:
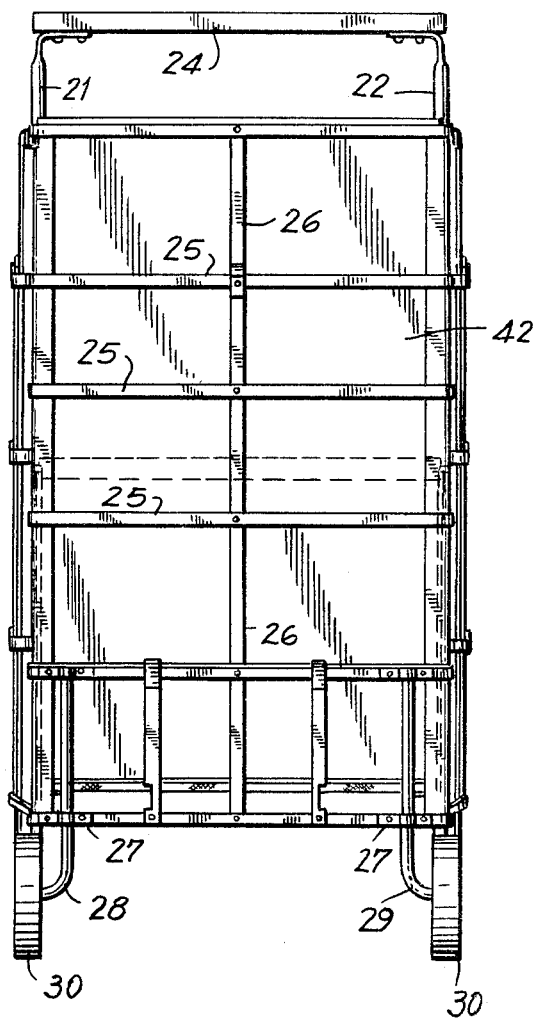
FIG. 4 is a rear elevational view thereof.
Figure 5:
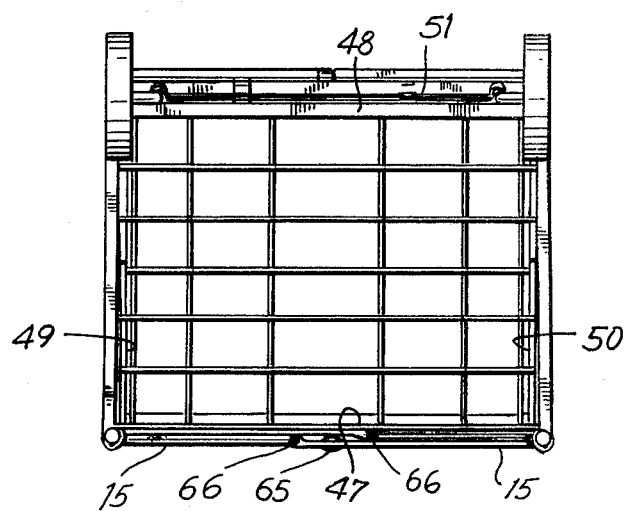
FIG. 5 is a bottom plan view thereof.
Figure 7:
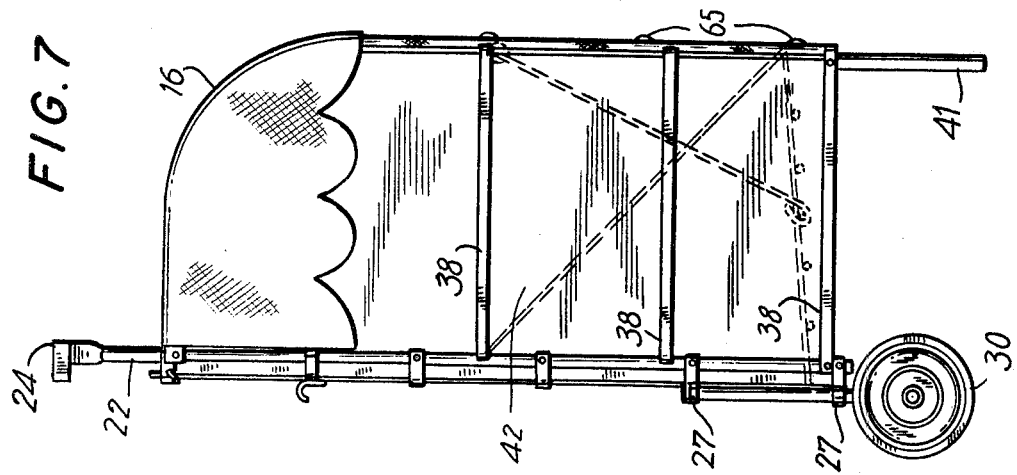
FIG. 7 is a side elevational view as seen from the right-hand portion of FIG. 6.
Figure 6:
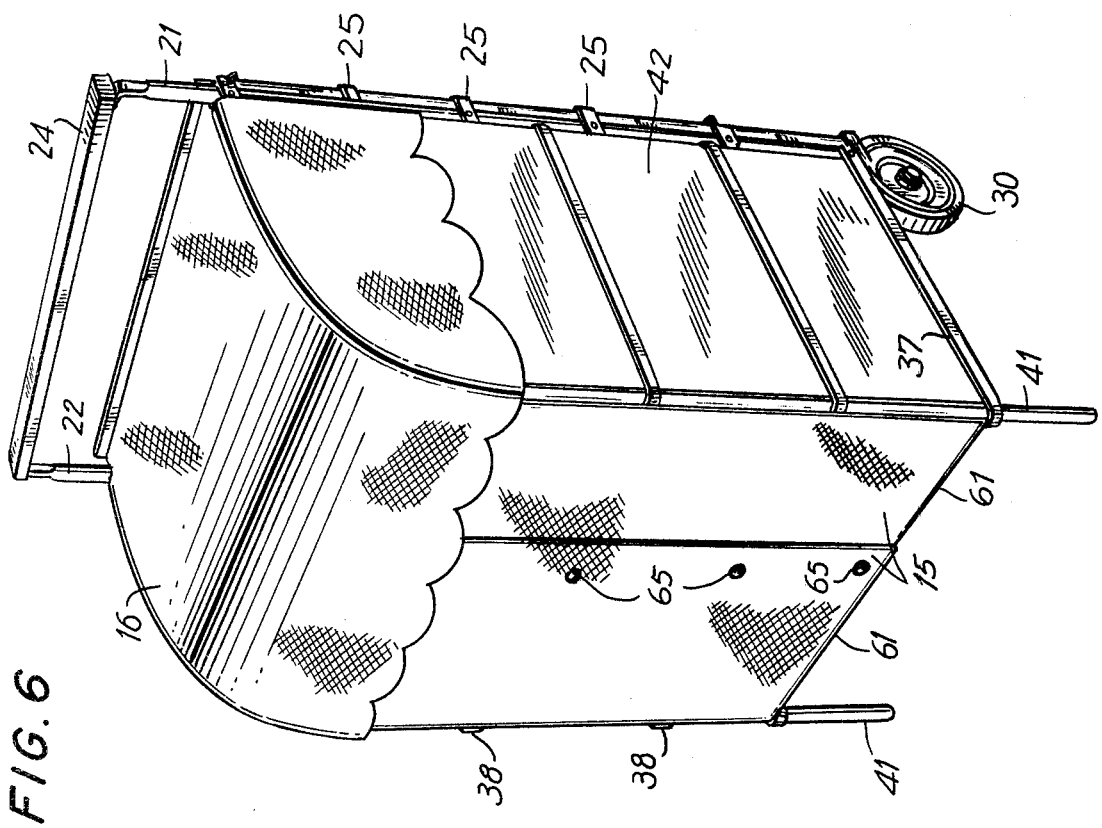
FIG. 6 is a perspective view thereof, showing a protective canopy in position.

In accordance with the first embodiment of the invention, the device, generally indicated by reference character 10, comprises broadly: a rear panel element 11, first and second side panel elements 12 and 13, respectively, a bottom panel element 14, a front panel element 15, and a canopy element 16.

The rear panel element 11 includes first and second side edge members 21 and 22, respectively, and an upper horizontal member 23 mounting a manually engageable handle 24. Horizontal brace members 25 and a vertical brace member 26 interconnect the peripheral structural members and provide rigidity. A lower frame 27 mounts arms 28 and 29, supporting wheels 30, the arms being interconnected to and moving with the side panel elements 12 and 13.

Figure 8:
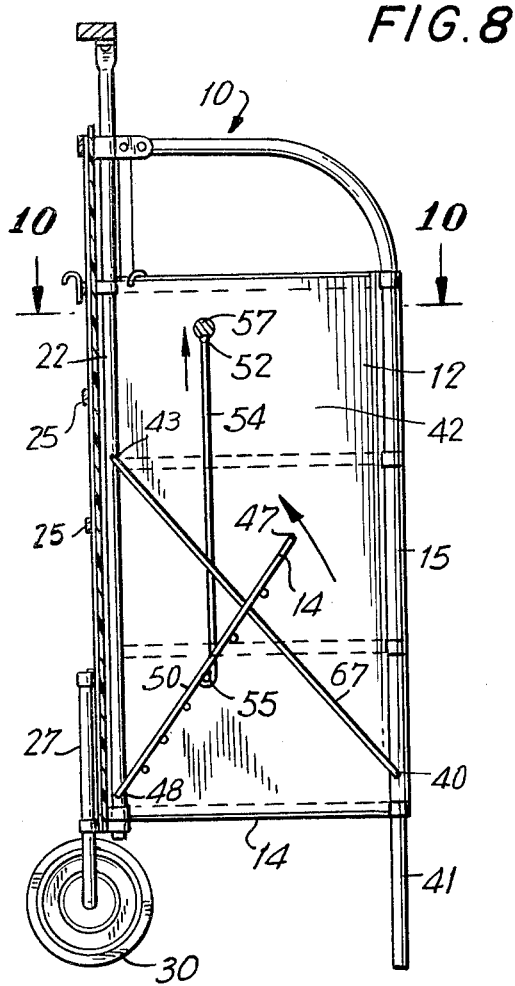
FIG. 8 is a central vertical sectional view showing a bottom panel in partly retracted position prior to folding the device.

The side panel elements 12 and 13 are similar and symmetrical each including a front vertical member 34, rear vertical members 35, upper and lower horizontal members 36 and 37, and medially positioned support members 38. Hinge means 39 interconnect each of the rear members 35 to the rear panel element 11 for pivotal movement through substantially 90°. At the lower forward corner of each side panel element is a leg member 41 which enables the cart to stand in substantially vertical condition when unattended. Synthetic resinous rigid panels 42 permit a reduction in the number of medial support members 25 and 38, although, if desired, the panels may be omitted with a corresponding loss of function, and substituted by a greater number of members 25 and 38. A bottom panel element guide 67 of relatively rigid wire extends from a lower end 40 in an upward and rearward direction to an upper end 43 (see FIG. 8).

The bottom panel element 14 is preferably formed of interconnected metal rods, although, if desired, it can also be made as a molding. It is bounded by a forward edge rod 47, a rearward edge rod 48, and side edge rods 49 and 50 which each slidably engage guide 67 to maintain the side panel elements in parallel tensed relation when the device is in erected condition. Rear hinge menas 51 interconnect with a lower portion of the rear panel element 11.

An operating member 52 includes a pair of side portions 53 and 54, interconnected at the lower ends 55 thereof to pivot points 56 on the side edges 49 and 50. An upper horizontal portion 57 interconnects the side portions 53 and 54 at the upper ends thereof, and is positioned at a level sufficiently high to afford manual engagement by a user without bending or stooping.

The front panel element 15 includes two sections held together by snaps 65 (FIG. 3), preferably formed of high strength coated flexible textile material, and bounded by an upper edge 60 and a lower edge 61. Side edges 62 and 63 form channels engaged by rods 64 which selectively interconnect with the forward edges of the side panel elements 12 and 13. Two rods, 66 are selectively engaged with another location on a respective side panel, so that the device may be used as an unenclosed cart for the transportation of luggage items, and the like, which would normally extend past the forward edge of the bottom panel element 14. When so used, the operating member 52 is moved to its rearwardmost position wherein the upper horizontal portion 57 abuts the rear panel element 11, thereby providing ample clearance. In this position, the bottom panel element 14 is supported at the forward edge ends thereof by the guides 67 which terminate at a level in which the bottom panel reaches horizontal orientation. As has been mentioned, by providing a pillow or a cushion on the upper surface of the bottom panel element 14, a child may be carried in comfort, and, if desired, during such use, an auxiliary strap means (not shown) can be used to interconnect the front edges of the side panel elements.

Figure 9:
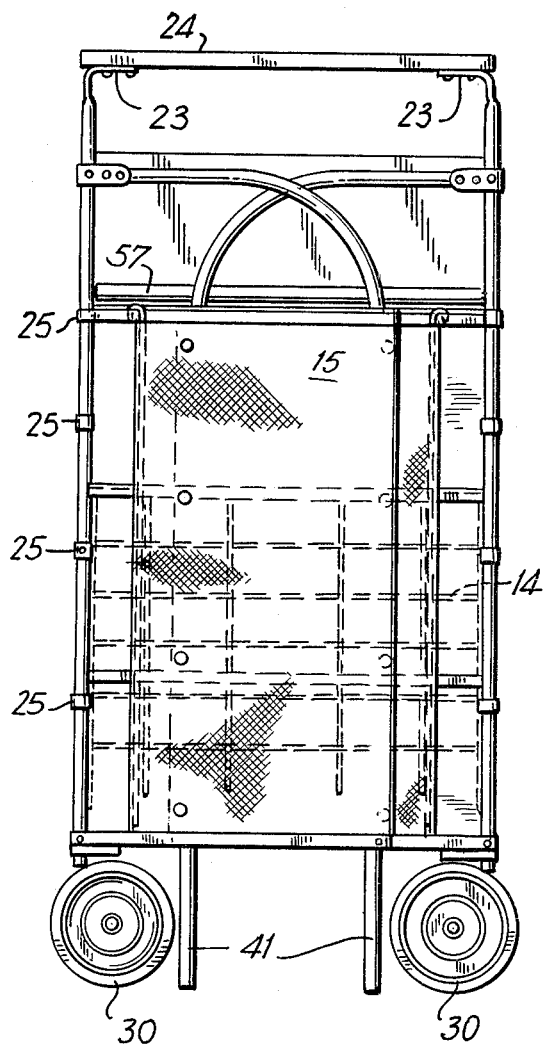
FIG. 9 is a front elevational view showing the device in fully folded condition.
Figure 10:
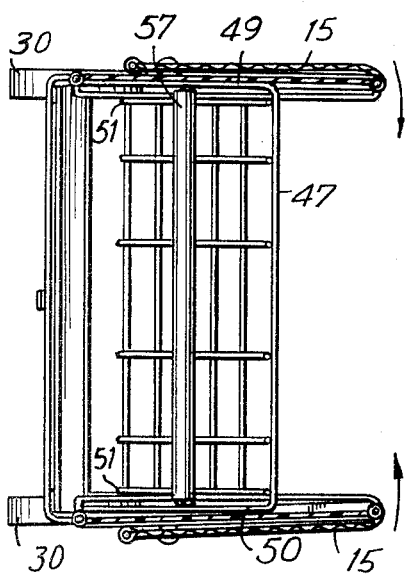
FIG. 10 is a sectional view as seen from the plane 10—10 in FIG. 8.

The device is conveniently erected or collapsed by merely raising or lowering the operating member 52 which moves the bottom panel element about an axis through the rear edge thereof between horizontal and vertical positions. During such movement, the guides 67 slide against the side edge rods 49 and 50. In the lowered position, the lower ends of the guides 67 support the front edge of the bottom panel element. In the raised position, the guides 67 pivot with the respective side panel elements to allow the side panel elements to be folded against the bottom panel element, which in turn is folded against the forward surface of the rear panel element, as shown in FIG. 9.

It may thus be seen that I have invented novel and highly useful improvements in shopping cart construction, embodied in a relatively inexpensive light-weight device having many selective arrangements of components for maximum use.

I wish it to be understood that I do not consider the invention limited to the precise details shown and set forth in this specification, for obvious modifications will occur to those skilled in the art to which the invention pertains.

I claim:

1. An improved shopping cart comprising: a rearwardly disposed main panel element of generally rectangular planar configuration, and having manually engageable means disposed substantially at an upper end thereof; first and second side panel elements of generally planar rectangular configuration, said side panel elements being hingedly interconnected at rearward edges thereof to respective first and second longitudinal edges of said main panel element, each of said side panel elements having wheel means adjacent a lower rear corner thereof so as to lie in substantially coplanar relation with said rear panel element when said cart is in folded condition; and a bottom panel element of planar rectangular configuration having means pivotally interconnecting a rear edge thereof to a lower portion of said rear panel element for movement about a horizontal axis through substantially a right angle, said bottom panel element having a manually engageable operating member interconnected at medial points on side edges of said bottom panel element for raising and lowering the same relative to said main panel element; guide rods carried by said side panel elements on the inner surfaces thereof, said guide rods being slidably engaged with said bottom panel element and having means at a lower end thereof supporting a forward edge of said bottom panel element in horizontal position and maintaining said side panel elements in mutually parallel relation.

2. A shopping cart in accordance with claim 1, further comprising a front panel element of non-rigid sheet material selectively interconnecting front edges of said side panel elements and forming a generally rectangular upper open-ended receptacle.

3. A shopping cart in accordance with claim 2, further comprising a rectangular canopy non-rigid sheet material having a rear edge thereof interconnected to a surface of said rear panel element, and having means selectively engaging upper edges of said side panel elements to cover said open-ended enclosure.

4. A shopping cart in accordance with claim 1, further characterized in said operating member comprising first and second vertical portions, and an upper horizontal portion interconnecting said first and second portions, and extending therebetween.

* * * * *